Aug. 19, 1969   H. B. VAN DORN   3,461,529
METHOD OF MAKING A BEARING
Filed Oct. 14, 1966                    2 Sheets-Sheet 1
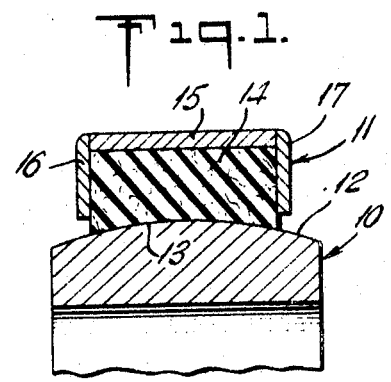
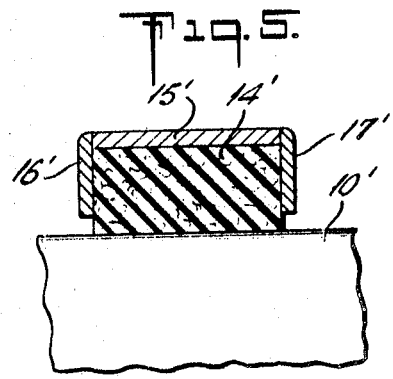
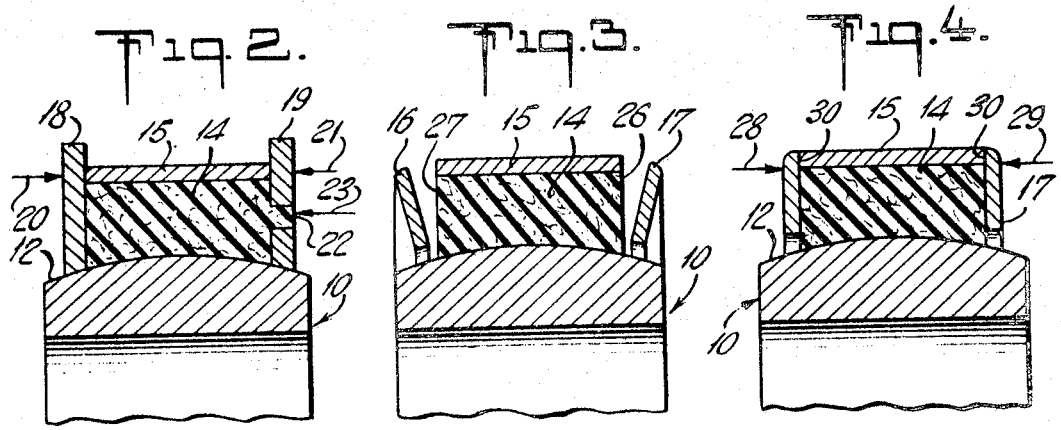
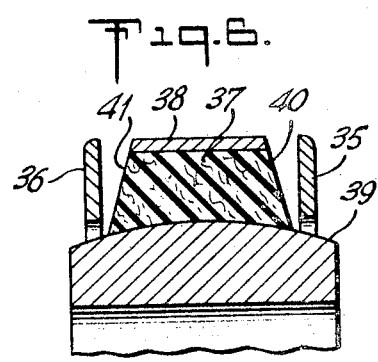
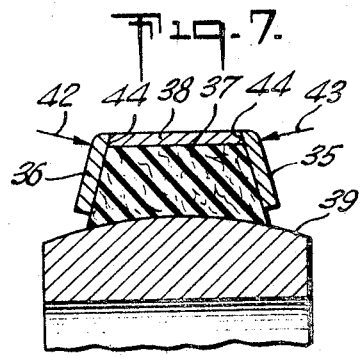
INVENTOR
HORACE B. VAN DORN
BY
Hopgood & Calimafde
ATTORNEYS Aug. 19, 1969   H. B. VAN DORN   3,461,529
METHOD OF MAKING A BEARING
Filed Oct. 14, 1966   2 Sheets-Sheet 2
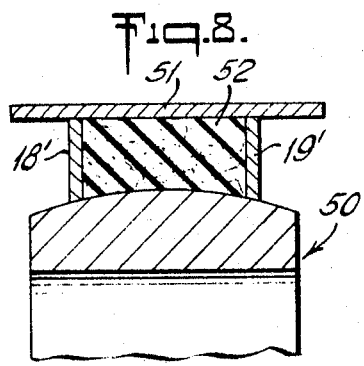
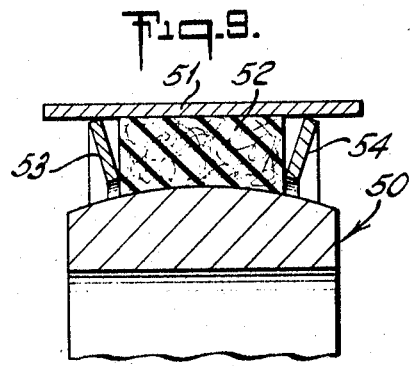
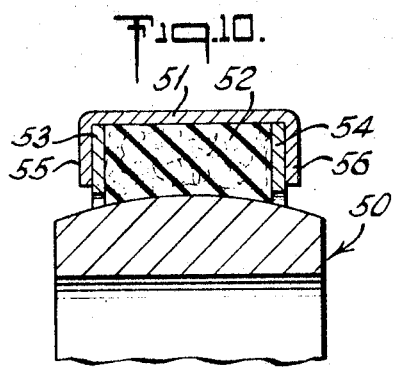
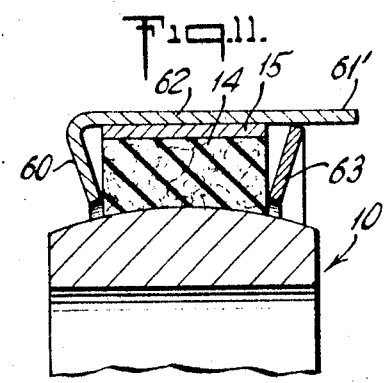
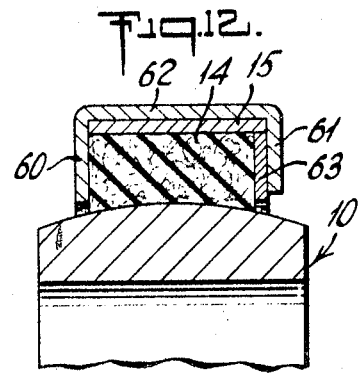
INVENTOR
HORACE B. VAN DORN
BY
Hopgood & Calimafde
ATTORNEYS United States Patent Office 3,461,529
Patented Aug. 19, 1969

3,461,529
METHOD OF MAKING A BEARING
Horace B. Van Dorn, Kensington, Conn., assignor, by mesne assignments, to Textron Inc., Providence, R.I., a corporation of Delaware
Filed Oct. 14, 1966, Ser. No. 586,883
Int. Cl. B21d 53/10
U.S. Cl. 29—149.5                                    5 Claims

ABSTRACT OF THE DISCLOSURE

The invention contemplates an improved method for making a bearing in which a molded mass of bearing material, which may include plastic, is the load-carrying element of one bearing member at the bearing interface. The load capacity of this element is enhanced by a particular configuration of walled metallic structure which inherently confines, reinforces and protects the molded element, while at the same time continuously subjecting the molded element to compressional stress. The claimed method inherently develops the desired residual compressional stress.

---

This invention relates to an improved bearing construction and method, involving sliding contact betweent load-sustaining elements.

Bearings of the character indicated are known as plain bearings. Commonly, they involve relative rotation or oscillation of inner and outer members, which have a cylindrical bearing interface in the case of journal bearings, or a spherical bearing interface in the case of plain spherical bearings. The present invention is particularly concerned with such bearings in which one of the rotatable elements includes a molded prismatic mass containing a cured plastic and constituting the prime bearing material at the bearing interface.

It is an object of the invention to provide an improved method for making bearings of the character indicated.

Another object is to provide a method for making bearings having inherently greater load-carrying capacity in a given size of bearing of the character indicated.

A further object is to meet the above objects with a method of elemental simplicity and low cost, lending itself to use in mass production.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

FIG .1 is a longitudinal sectional view of a completed bearing of the invention;

FIGS. 2, 3 and 4 are similar views illustrating successive steps in a method of making the bearing of FIG. 1;

FIG. 5 is a view similar to FIG. 1 to illustrate an alternative construction; and FIGS. 6 and 7, FIGS. 8 to 10, and FIGS. 11 and 12 are views similar to FIGS. 3 and 4 to illustrate each of three alternative methods and constructions.

Briefly stated, the invention contemplates an improved bearing construction and method of the character indicated wherein a molded mass of material, including plastic, is the load-carrying element of one bearing member at the bearing interface. The load capacity of this element is enhanced by a particular configuration of walled metallic structure which inherently confines, reinforces and protects the molded element, while at the same time continuously subjecting the molded element to compressional stress.

Referring to FIG. 1, the invention is shown in application to a so-called plain spherical bearing comprising inner and outer members 10–11 having sliding contact at an interface defined between the convex spherical surface 12 of the metal ring or ball 10 and the concave spherical surface 13 of the bearing material 14 of outer member 11. The bearing material 13 may be one of a variety of mixtures or compounds, including preferably asbestos and shredded Teflon fiber, and further including a plastic, such as a phenolic, cured to final hardness, so that the bearing material 14 is a solid prismatic mass or block circumferentially continuously surrounding and slidable over the spherical surface 12. In accordance with the invention, reinforcement, support and protection for the liner mass 14 are provided by a metal casing covering the remaining surfaces of mass 14 and comprising an outer ring or tube 15 and opposed end plates 16–17, secured to tube 15, as by spot or other welding techniques.

Accordingly to a method of the invention, the bearing material 14 is molded in place, surrounding the convex surface 12, by utilizing the outer retaining tube 15 and ball 10 as parts of the mold. As shown in FIG. 2, temporary end plates 18–19 complete the definition of the mold cavity, and arrows 20–21 suggest the application of an axial clamping force during the molding operation. Molding may be accomplished by injection-molding techniques and may utilize an inlet port or sprue passage 22 in one of the molding end plates (19); injection of metal molding material is suggested by the arrow 23. After the bearing material 14 has been allowed to cure to the hardened state, the temporary mold plates 18–19 are removed, and any sprue projection is cut off, so that the assembly then has the appearance of the parts labelled 10–14–15 in FIG. 3.

In accordance with a further feature of the invention, residual compressionally loading stress is continuously applied to the body of the bearing-material mass by means of metal end plates 16–17 which, in the process of assembly to the structure 10–14–15, are axially compressionally stressed. For the form shown, in which the molding operation of FIG. 2 produces end faces 26–27 in parallel radial planes, the end plates 16–17 are preferably of stiffly compliant metal and are oppositely dished, being frusto-conical in their unstressed state, all as suggested by their respective slopes in the unassembled state depicted in FIG. 3.

To complete the assembly, axial clamping force (suggested by arrows 28–29 in FIG. 4) is applied to squeeze end plates 16–17 against the molded mass, until these plates abut and align peripherally with the tube 15. In this clamped condition, the metal retainer or housing parts are connected to each other as by spot or other welding techniques; such welding is suggested at 30 in FIG. 4. The axial compression of end plates 16–17 thereafter remains as a continuous compressional stress on the mass 14, throughout the life of the bearing.

The structure in FIG. 5 is merely intended to illustrate that essentially the method described in FIGS. 1–4 may be employed to make a journal bearing wherein a prismatic mass (including hardened plastic) constitutes the part 14 and is molded against the periphery of a rod, shaft, or inner bearing element 10'. Retention, protection and support of the plastic bearing material 14' under compressionally loaded stressed conditions is accomplished by retainer tube and end-plate members 15'–16'–17; as has been previously described.

In the arrangement of FIGS. 6 and 7, the end-plate members 35–36 are again formed of stiffly compliant metal, but in the unstressed state these members are essentially flat as shown in FIG. 6. On the other hand, the molded mass 37, within the outer tube 38 and conforming to the convex spherical circumference of the inner ring or ball 39, is characterized by opposed conical formations of walls 40–41. Under these circumstances, when axial clamping forces are applied, as suggested by arrows 42–43 in FIG. 7, the previously flat end plates 35–36 are deformed into conical shape and are welded or otherwise permanently secured in this position, by welding at 44.

The remaining figures illustrated techniques and structures embodying the invention but not relying on welding. According to the method of FIGS. 8 to 10, a bearing is formed at the spherical surface of an inner ring 50, the other ring comprising an outer metallic sleeve 51 radially confining the mass 52 of bearing material; the sleeve 51 has integral radial end flanges 55–56 in axially stressed compressional loading relation with axial ends of the mass 52. As illustrated, washers 53–54 are interposed between flanges 55–56 and the corresponding ends of sleeve 51.

In making the structure of FIG. 10, the sleeve 51 is seen in FIG. 8 to be initially straight cylindrical, temporary mold elements 18'–19' being employed in molding the mass 52 in the space between sleeve 51 and ring 50; the molding location is central of sleeve 51 so as to allow the axial ends of sleeve 51 to project beyond the corresponding ends of mass 52. After molding, the temporary elements 18'–19' are removed, and the flanges 55–56 may be directly formed radially into stressed engagement with the ends of mass 52. I prefer, however, to employ the additional instrumentality of spring elements 53–54 to assure adequate compressional loading of mass 52. FIG. 9 illustrates that elements 53–54 may be oppositely dished frusto-conical washers, as at 16–17 in FIG. 3; they are permanently retained in flattened condition (i.e. under stress) by forming the retaining flanges 55–56, as by spinning the projecting ends of sleeve 51 to the relationship of FIG. 10.

In the method of FIGS. 11 and 12, the basic molded assembly 10–14–15 of FIG. 3 is utilized, but compressional loading of mass 14 is achieved by opposed flanges 60–61 of an outer sleeve 62, circumferentially contacting that surface of ring 15 which is opposite the bearing surface. Preferably, the sleeve 62 is initially formed with flange 60, the same being locally case-hardened at flange 60 to assure its stiff compliance, without affecting the workability of the other projecting end 61' of sleeve 62. After insertion-assembly of the molded parts with sleeve 62, the projecting end 61' may be deformed into flange 61, relying on the compliance of flattened flange 60 alone to assure the desired compressional loading. However, I prefer to form flange 61 after assembling a dished spring washer 63 to the exposed end face of mass 14, thereby achieving the enhanced stressed loading which is attributable to flattened flange 60 and to flattened washer 63.

It will be seen that I have described improved bearing constructions and methods of elemental simplicity, inherently adapted to low-cost fabrication. The casings defined by the confining sleeve or tube and the end plates almost completely surround the liner mass and have but a small running clearance with the bearing surface on which the bearing material rides. The arrangements are such as to inherently protect, support and reinforce the plastic or the like material which constitutes the molded mass and under conditions of controlled axial compression, so as to permit greater load-carrying capability for a given size. The form illustrated in FIGS. 6–7 will be seen to provide extended bearing-interface area for particular purposes, and to be realizable with the retaining-flange techniques of FIGS. 8 to 12, as well as with the welding techniques specifically illustrated.

While I have described the invention in detail for the preferred forms and methods illustrated, it will be understood that modifications may be made within the scope of the invention as defined by the claims which follow.

What is claimed is:

1. The method of making a plain bearing having inner and outer ring members relatively rotatable about a central axis and having circumferentially continuous sliding contact, which comprises selecting elongated metal tube means to be a confining element of one of said ring members, said tube means including a cylindrical surface of diameter to permit axially overlapping said other ring member and said cylindrical surface in radially spaced relation, applying annular mold elements to said tube means and to said other ring member at axially spaced locations to define the respective axial ends of radial space therebetween, thereby defining a mold cavity extending axially between said annular elements and radially between said other ring member and said cylindrical surface, at least one axially projecting end of said tube means extending axially beyond the mold cavity, injecting a moldable bearing material into the cavity, curing the injected material, removing the annular mold elements, whereby at least said one end of said tube means projects axially beyond the corresponding end of the molded mass, selecting and applying to said end of the molded mass a dished stiffly compliant frusto-conical washer with the direction of conical taper being such as to establish in the region of radial proximity to said tube means a greater axial clearance between said washer and the molded mass than exists at the other radial limit of said washer, and integrally radially forming said projecting tubular end into radial overlap with said region and in axially compressing relation with said washer.

2. The method of claim 1, in which the extent of such compressional loading substantially flattens said washer against the adjacent end of the molded mass, and wherein said washer extends into relatively close locally clearing adjacency to said other ring member, whereby axial preload of the molded mass is primarily applied in the region of bearing relation between the molded mass and said other ring member.

3. The method of claim 1, in which said tube means extends axially beyond both annular mold elements, whereby said tube means projects beyond both ends of the molded mass, and in which oppositely dished frusto-conical washers are applied adjacent the respective ends of the molded mass prior to forming said projecting ends into radially overlapping and axially compressing relation with said washers.

4. The method of claim 1, in which said tube means comprises telescoping cylindrical elements, the cylindrical element which is radially facing said other ring member being of lesser axial extent than the other cylindrical element, said annular mold elements being applied to the respective ends of said first-mentioned cylindrical element, whereby the molded mass extends to the ends of said first-mentioned cylindrical element.

5. The method of claim 4, which includes, prior to the step of forming said projecting tubular end into radial overlap with said washer, the step of forming an axially inwardly directed integral flange at the other axial end of said other cylindrical element, the dished direction of said flange being opposed to that of said washer.

References Cited

UNITED STATES PATENTS

| | | | |
|---|---|---|---|
| 2,368,886 | 2/1945 | Schroeter | 308—72 |
| 2,864,130 | 12/1958 | Beare | 264—262 X |
| 2,983,555 | 6/1961 | Miller | 308—72 |
| 3,034,838 | 6/1962 | Abel | 308—72 |
| 3,056,709 | 10/1962 | Rising et al. | 308—238 X |
| 3,089,198 | 6/1963 | Eirhart | 264—262 X |
| 3,099,879 | 8/1963 | Horovitz | 264—242 X |
| 3,218,098 | 11/1965 | Rowlett | 308—238 X |
| 2,307,874 | 1/1943 | Bilde | 264—312 X |
| 3,085,312 | 4/1963 | Evans. | |
| 3,193,910 | 7/1965 | Evans | 29—441 X |
| 3,217,388 | 11/1965 | White. | |

FOREIGN PATENTS 117,070  7/1943  Australia.

OTHER REFERENCES

German printed application: Latzen, E 10,373, July 26, 1956.

THOMAS H. EAGER, Primary Examiner

U.S. Cl. X.R.

29—441, 451; 264—262, 312; 308—37, 72